United States Patent [19]

Jacques et al.

[11] 4,217,084

[45] Aug. 12, 1980

[54] DEVICE FOR CRIMPING FERRULES ONTO BUNDLES OF OPTICAL FIBRES

[75] Inventors: Andrè Jacques; Christian Malsot; Chantal Moronvalle; Edith Bertau, all of Suresnes, France

[73] Assignee: Socapex, Suresnes, France

[21] Appl. No.: 964,794

[22] Filed: Nov. 28, 1978

[30] Foreign Application Priority Data

Nov. 28, 1977 [FR] France .................................. 77 35775

[51] Int. Cl.³ .............................................. A21C 3/06
[52] U.S. Cl. ........................................ 425/321; 264/1; 264/162; 264/168; 264/292; 264/293; 425/385; 425/392; 425/393
[58] Field of Search ............... 425/393, 320, 385, 392, 425/321; 264/292, 293, 320, 168, 162, 103, 1

[56] References Cited

U.S. PATENT DOCUMENTS

| | | | |
|---|---|---|---|
| 2,418,974 | 4/1947 | Henry | 425/393 |
| 2,822,600 | 2/1958 | Scott | 264/162 |
| 3,205,289 | 9/1965 | Carpenter | 425/393 |
| 3,364,289 | 1/1968 | Campbell | 264/103 |
| 3,447,296 | 6/1969 | Chidgey et al. | 264/168 |
| 3,509,797 | 5/1970 | Johnson | 425/391 |
| 3,635,634 | 1/1972 | Nagano et al. | 425/391 |
| 4,038,011 | 7/1977 | Lemelson | 425/393 |
| 4,092,396 | 5/1978 | McCourtney et al. | 264/320 |
| 4,117,064 | 4/1978 | Mathe et al. | 425/391 |

*Primary Examiner*—Jay H. Woo
*Attorney, Agent, or Firm*—Cushman, Darby & Cushman

[57] ABSTRACT

The invention relates to a manual and portable device for crimping ferrules onto bundles of optical fibres comprising a number of fibres such that these fibres may be hexagonally arranged. The device primarily comprises means for holding the ferrule in the tool, crimping means essentially consisting of an element supporting three knurled rollers which is capable of being rotated whilst the three knurled rollers, at the same time as rotating, may be moved progressively nearer the axis of the bundle until their spacing corresponds to the minimum cross-section of the bundle. The device may also comprise a release mechanism enabling the approach movement of the knurled rollers to be stopped when this cross-section is reached.

4 Claims, 7 Drawing Figures

DEVICE FOR CRIMPING FERRULES ONTO BUNDLES OF OPTICAL FIBRES

BACKGROUND OF THE INVENTION

1. Field of the Invention

This invention relates to a device for crimping ferrules onto bundles of optical fibres and, more particularly, onto bundles comprising a number of fibres such that the fibres are capable of being hexagonally arranged.

2. Description of the Prior Art

In one known method for mounting a bundle of optical fibres in a ferrule, a malleable material is deformed around the bundle. The bundle is then polished at its end and thereafter may be connected to another bundle. This method, of which the main advantages are its simplicity and the precision with which the fibres are centred in relation to the plastic material surrounding the bundle, does not enable the arrangement of the fibres in the bundle to be optimised, the fibres being disposed in a randon manner in the polished surface.

SUMMARY OF THE INVENTION

The present invention relates to a simple device of a manual and portable type which enables this hexagonal arrangement of the bundle of optical fibres to be definitively obtained.

In particular, the device according to the invention for crimping ferrules onto bundles of optical fibres is such that, providing the number of fibres in the bundle is such that the fibres can be hexagonally arranged, the hexagonal arrangement of the bundle is obtained by circularly crimping the ferrule around the bundle, the crimping diameter decreasing during the crimping operation to a minimum diameter which corresponds to an arrangement in which the fibres are tangential.

According to the invention, the device for crimping ferrules onto bundles of optical fibres is such that it comprises means for holding the bundle of optical fibres, the bundle having been previously equipped with a malleable ferrule to be crimped, crimping means comprising knurled rollers distributed on a circle situated in a plane orthogonal to the longitudinal axis of the bundle and centred on that axis and a mechanical system for controlling the knurled rollers, this mechanical control system being such that the knurled rollers are rotated and, at the same time, moved towards the axis of the bundle and act on a deformable sleeve surrounding the bundle until the minimum diameter of the bundle, which corresponds to a hexagonal arrangement of the fibres in the bundle, is reached.

BRIEF DESCRIPTION OF THE DRAWINGS

The invention will be better understood and other features thereof will become apparent from the following description in conjunction with the accompanying drawings, among which.

DESCRIPTION OF THE PREFERRED EMBODIMENT

Figure 1A:
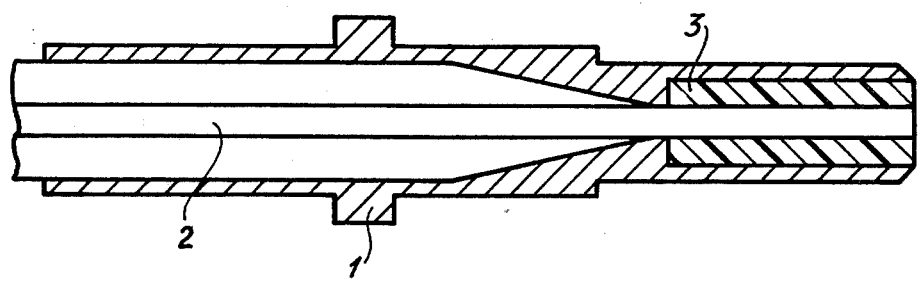
FIGS. 1(a) and 1(b) diagrammatically illustrates a bundle of fibres equipped with a ferrule and a deformable sleeve before and after crimping by the device according to the invention.
Figure 1B:
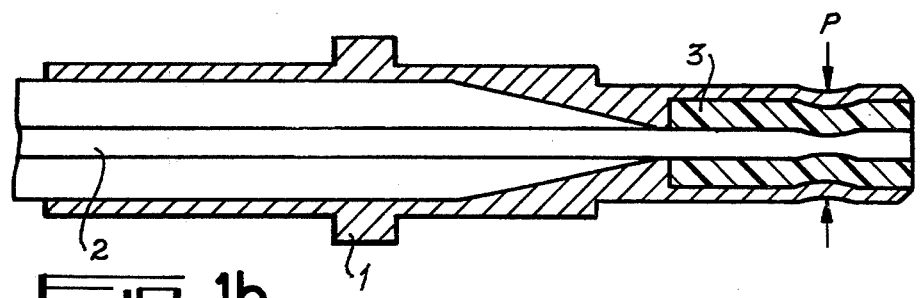

FIG. 1(a) shows the ferrule of the bundle of optical fibres before crimping by the device according to the invention and FIG. 1(b) the same ferrule after crimping.

The ferrule 1, into which the bundle of optical fibres, 2, is introduced, is made of a deformable material, for example brass. A deformable sleeve 3 is placed at the end of this ferrule. The ferrule itself is rigid whilst the sleeve is highly flexible, which facilitates crimping, although a single deformable ferrule would be sufficient to obtain the required effect. The fibres are then placed in the ferrule 1 equipped with its sleeve 3 (FIG. 1(a)).

The assembly is then introduced into the device described hereinafter to be crimped. This device circularly crimps the ferrule, pressing the fibres against one another in such a way that the cross-section of the bundle becomes minimal. An optimal arrangement is obtained when the fibres are all tangential to one another, which is obtained when these fibres can be hexagonally arranged. After crimping, the ferrule has the form shown in FIG. 1(b), the ferrule and the sleeve being deformed. In the section P, the fibres are hexagonally arranged, the arrangement of the fibres becoming more random with increasing distance from this section along the longitudinal axis of the ferrule.

Figure 2:
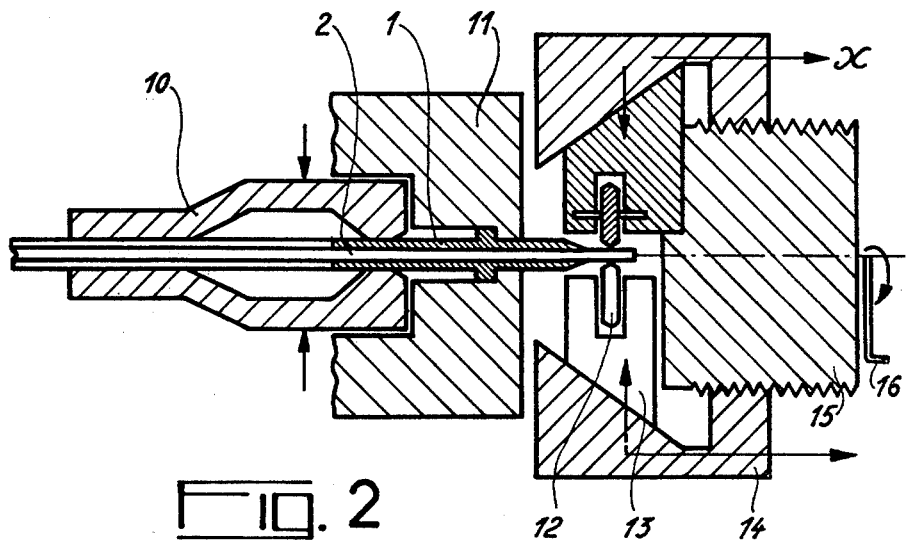
FIG. 2 is a simplified diagram of the device according to the invention.

By a polishing operation up to this section P, it is then possible to obtain a bundle equipped with a ferrule, at the end of which the fibres are hexagonally arranged. The simplified view of the device illustrated in FIG. 2 shows its main components and explains its mode of operation.

The device primarily comprises a clamp, diagrammatically represented by the element 10, which enables the ferrule 1 of the bundle 2 to be firmly held after it has been suitably positioned. The positioning of the ferrule 1 is obtained when it comes into contact with an element 11.

The ferrule thus locked in position may then be crimped. To this end, the device comprises crimping means consisting primarily of three knurled rollers, such as 12, mounted in a conical roller support 13 formed by three parts connected by springs. The roller support is mounted in a conical mandrel 14 which is capable of being displaced along the longitudinal axis of the tool by a control screw 15.

Figure 3A:
FIGS. 3(a), 3(b), and 3(c) show the hexagonal arrangements obtained for 7, 19 and 37 fibres.
Figure 3B:
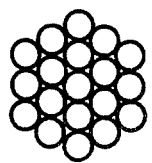
Figure 3C:
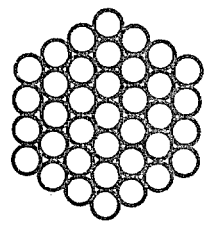

The mode of operation of this crimping means is as follows:

A lever 16 enables the control screw 15 to be rotated. This rotation results in a movement of the conical mandrel 14 in the direction indicated by the arrow x in the Figure. This movement in the direction of the arrow x of the conical mandrel 14 results in the radial displacement of the three parts of the roller support by compression of the springs. The knurled rollers themselves thus move towards the longitudinal axis of the tool. At the same time, the screw 15 comprises radial slots in which corresponding projections of the roller support 13 are engaged. Thus, when the screw 15 is rotated, it also rotates the roller support 13. Accordingly, this element simultaneously undergoes a rotational movement and a movement which brings the knurled rollers towards the axis. The rotation of the roller support results in a circular crimping of the deformable ferrule which, by contracting, gives rise to the formation of a hexagonal arrangement of the constituent fibres of the bundle providing of course that the number of fibres lends itself to a hexagonal arrangement. Accordingly, a device such as this is particularly suitable for crimping bundles comprising, for example, 7, 19 or 37 fibres and in general $N=1+3n(n-1)$ where n is an integer greater than 1. The exemplified numbers correspond to the arrangements illustrated in FIG. 3 at a, b and c, respectively. Naturally, the knurled rollers must not be brought too close to the axis. Beyond a certain crimping diameter, where the fibres are hexagonally arranged and tangential, crimping cannot be continued without breaking the fibres. This diameter may correspond to a reference mark on the screw 15, which represents a limit to the travel of the conical mandrel 14, or better still to an adjustable stop on this screw beyond which the device is immobilised, the minimum diameter being reached.

The device may also comprise a release mechanism which, when the minimum diameter has been reached, enables the travel of the conical mandrel to be stopped without at the same time stopping the rotation of the roller support.

Figure 4:
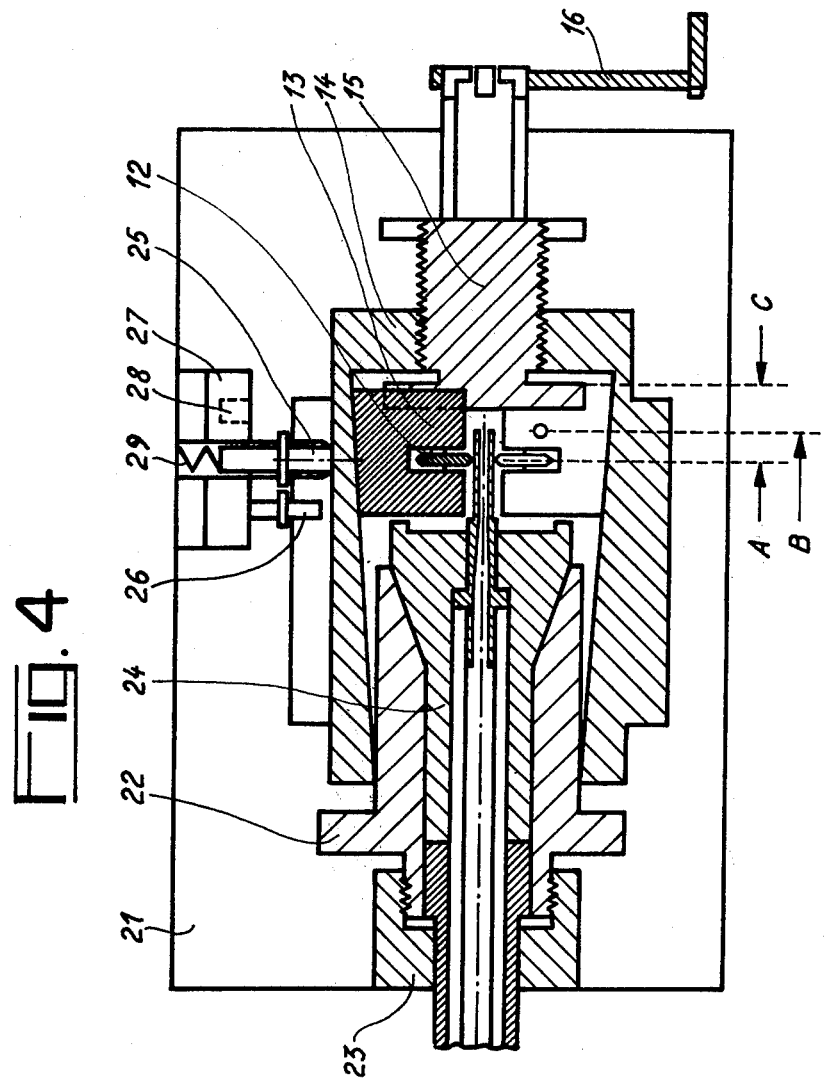
FIG. 4 is a detailed longitudinal section through the device.

The device shown in more detail in FIG. 4 comprises a release mechanism of the type in question. More particularly, this tool comprises a baseplate 21, supporting the various components of the device, means for holding the ferrule, means for crimping the ferrule and a release mechanism. The means for holding the ferrule consists of a clamp socket 22 which is capable of being screwed into a screwthreaded support 23. The clamp socket surrounds a fixed slotted clamp-forming element 24 of which the end is conical. By screwing down the clamp socket against the end of the clamp-forming element, the bundle of fibres is immobilised after it has been suitably positioned. On completion of this preliminary positioning operation, the actual crimping operation may be carried out. To this end, the device comprises the elements of the clamping means described above with reference to FIG. 2, i.e knurled rollers such as 12 mounted in a conical roller support 13 which itself is mounted in a conical mandrel 14. This mandrel is prevented from rotating by retractable pin 25 then engaged and is thus displaced along the longitudinal axis when the screw 15 is turned. The knurled rollers thus move towards the centre and, at the same time, rotate because, to this end, the roller support comprises projections engaged in corresponding slots provided at the end of the screw 15. The release mechanism enables the pin 25 to be removed so that the conical mandrel then rotates at the same time as the screw and, hence, is no longer displaced. Rotation of the screw 15 by an additional turn then enables the ferrule to be crimped onto the bundle around its entire circumference to the minimum diameter thus reached.

This release mechanism thus comprises the retractable pin 25, a guide finger 26 and a fixed adjusting disc 27. The guide finger is integral with the retractable pin 25 which is centred in relation to the adjusting disc.

The adjusting disc comprises a hole 28 at the same distance from the centre of the disc as the guide finger. When the conical mandrel is displaced, the pin 25 integral with the adjusting disc 27 moves relative to the mandrel in a longitudinal slot provided to this end in the mandrel. At the same time, the guide finger 26, which is held in a slot orthogonal to the slot in which the retractable pin 25 is held, describes an arc about this axis on the adjusting disc until it is opposite the hole 28 provided in the disc 27. At this moment, return springs 29 return the retractable pin to the recess provided for this purpose because the guide finger which is integral with the pin 25 is no longer an obstacle to this return movement.

Accordingly, the diameter of the cross-section of the bundle, beyond which the knurled rollers should not come any closer together, may be adjusted by suitably positioning the hole 28 provided in the adjusting disc so that, under the release effect, the conical mandrel becomes free to rotate.

Figure 5:
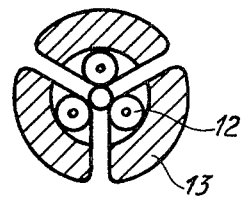
FIGS. 5, 6 and 7 are cross-sections through the device respectively taken along the planes A, B and C of FIG. 4.
Figure 6:
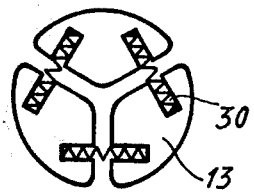
Figure 7:
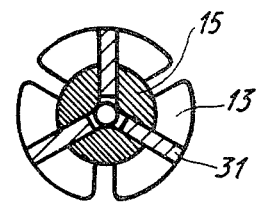

In FIGS. 5, 6 and 7, the sections along A, B and C through the device illustrated in FIG. 4 enable the structure of the tool to be better understood. The section A shows the knurled rollers 12 mounted in the roller support 13.

The section B shows the springs 30 connecting the three parts of the roller support. The section C shows the roller support equipped with projections 31 which are engaged in corresponding slots provided in the screw 15 in such a way that the roller support is rotated by the rotation of the screw without inhibiting the movement towards the centre of the three parts forming the roller support.

On completion of crimping, all that remains is to free the bundle by unscrewing the holding means and to polish the end of the bundle thus obtained.

The invention is by no means limited to the embodiment described above with reference to the accompanying drawings. In particular, any device intended for crimping deformable ferrules for bundles of optical fibres comprising crimping means formed by a mechanial system for controlling knurled rollers, these knurled rollers being distributed on a circle situated in a plane orthogonal to the longitudinal axis of the beam and centred on this axis, the mechanical system causing the knurled rollers to rotate and, at the same time, to move towards the axis of the bundle until the minimum diameter of the bundle has been reached, is included within the scope of the invention.

What we claim is:

1. A device for crimping ferrules onto bundles of optical fibres comprising N fibres, $N=1+3n(n-1)$, in being an integer greater than 2, comprising means for holding the bundle of fibres in a fixed position, said bundle having a longitudinal axis and having been previously equipped with a deformable ferrule to be crimped, crimping means comprising knurled rollers distributed on a circle situated in a plane orthogonal to the longitudinal axis of the bundle and centred at a fixed point on this axis and a mechanical system for controlling the knurled rollers, this mechanical system being such that the knurled rollers are rolled along said circle on said ferrule and, at the same time, the diameter of said circle is reduced as said rollers are moved towards said point the axis of the bundle and act on the cylindrical outer wall of the ferrule until a minimum diameter of the bundle, which corresponds to a hexagonal arrangement of the fibres in the bundle, is reached.

2. A device as claimed in claim 1, wherein said mechanical system for controlling the knurled rollers comprises a slotted conical roller support, a conical mandrel surrounding the roller support and a control screw designed to be screwed into the conical mandrel and producing a longitudinal displacement thereof to compress the roller support so that the knurled rollers move towards the axis, the conical mandrel being secured against rotation.

3. A device as claimed in claim 2, further comprising a release mechanism which enables the movement of the knurled rollers towards the axis of the bundle to be stopped when the minimum diameter is reached, crimping then being effected at a constant diameter.

4. A device as claimed in claim 3, wherein said release mechanism releases the conical mandrel for rotation, rotation of the control screw then resulting in rotation of the conical mandrel secured against displacement.

* * * * *